United States Patent Office 3,237,517
Patented Mar. 1, 1966

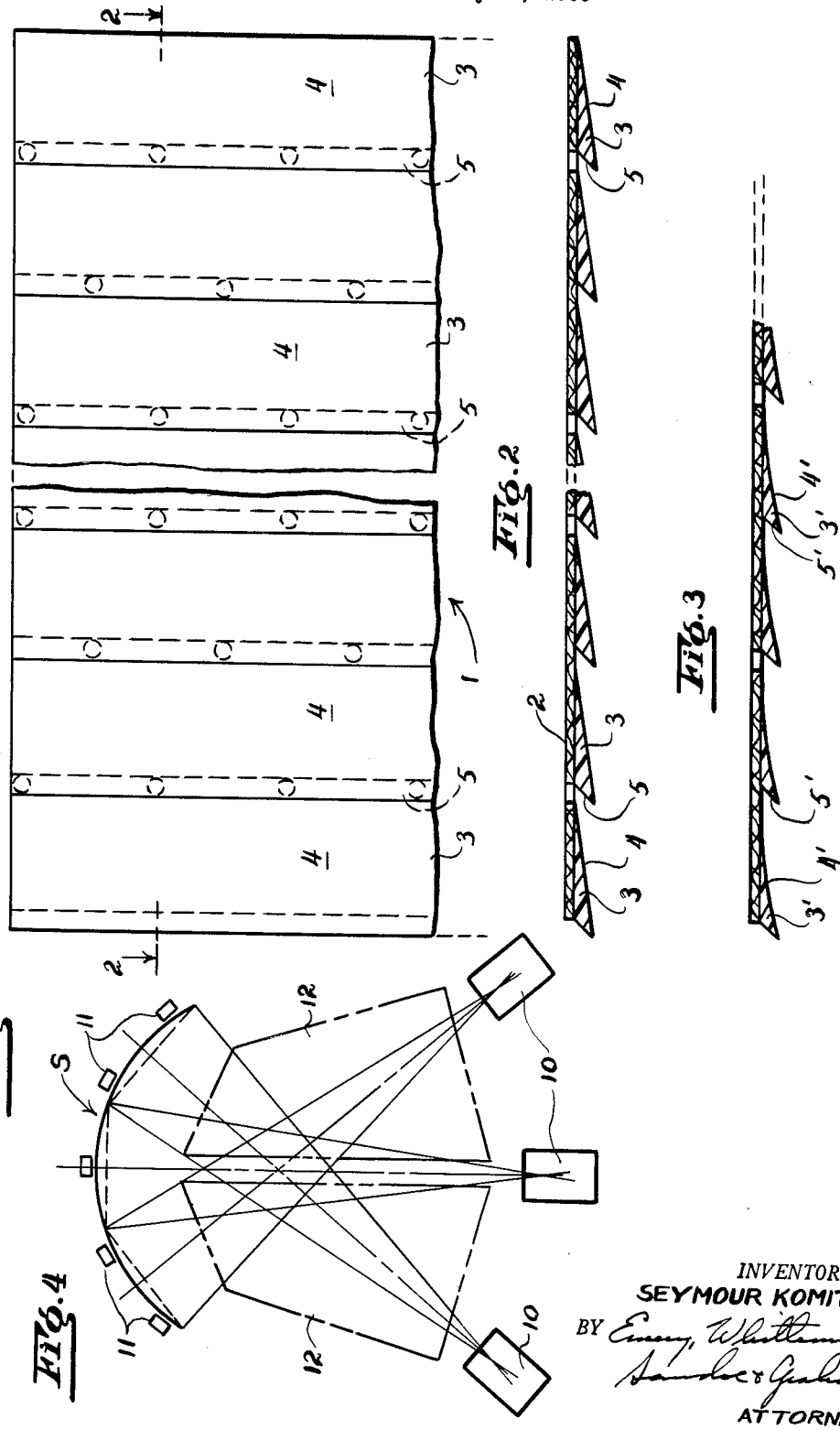

3,237,517
CURVED PROJECTION SCREENS
Seymour Komitor, Freeport, Long Island, N.Y., assignor, by mesne assignments, to Bank of America National Trust and Savings Association
Filed July 19, 1963, Ser. No. 296,184
9 Claims. (Cl. 88—28.9)

This invention relates to curved projection screens. Heretofore, a problem in the development and use of deep curved projection screens, such as those used in certain processes for the projection of motion pictures, has been intra-screen reflection wherein light projected onto one portion of the screen is reflected or scattered toward another portion of the screen with resultant degradation of the projected image.

Presently, a curved screen such as illustrated in U.S. Patent No. 2,476,521 is being used extensively to prevent such degradation. Such screens comprise a large number of overlapping vertical narrow strips of tape angled to reflect light projected onto one portion of the screen away from other portions of the screen. These strips are perforated to permit transmission of sound. They are supported under tension by a frame and are held in proper position by guides arranged at intervals along their length.

While such screens are reasonably satisfactory they have certain inherent disadvantages. The strips tend to flutter upon exposure to moving air and due to their length, it is difficult to keep them properly positioned. Vibration of the strips may cause acoustical distortion of the sounds from the speakers which are of necessity located behind the screen.

Such screens are difficult to assemble and disassemble, and difficult to transport. If the screen is to be transported to a different location, the strips must be individually removed. Then in reassembling the screen, the strips must each be individually mounted. If it is desired to mount the strips on a smaller frame, each individual strip must be shortened to fit the new frame.

Moreover, the perforations in the reflecting surface required for sound transmission reduce the reflective area and lessen the brightness of the image.

It is an object of the invention to provide a curved projection screen consisting of a plurality of panels each having a multiplicity of light reflecting elements mounted thereon in such manner as to reflect projected light away from other screen areas.

Another object of the invention is to provide a curved projection screen in which the individual light reflecting elements which form the face of the screen are so small that they are not noticeable.

Another object of the invention is to provide a curved projection screen which permits adequate sound transmission with a minimum of acoustical distortion.

Another object of the invention is to provide a curved projection screen in which the individual light reflecting elements are imperforate but are mounted on a backing sheet having apertures or perforations for adequate sound transmission, said elements being mounted in such manner that said apertures or perforations are concealed thereby.

It is a further object of the invention to provide a curved projection screen which is more rigid than has heretofore been possible.

Another object of the invention is to provide a curved projection screen which comprises panels which may be easily mounted and which may be easily adjusted to frames of different dimensions.

Other objects and advantages of the invention will appear hereinafter.

A preferred embodiment of the invention selected for purposes of illustration is shown in the accompanying drawings, in which, FIGURE 1 is an enlarged front elevation of a small portion of a panel forming part of a projection screen.

FIGURE 2 is a section on the line 2—2 of FIGURE 1.

FIGURE 3 is a similar section through a modified form of reflecting element.

FIGURE 4 is a diagram of a curved screen illustrating the relation of the screen curvature to typical projection equipment.

According to the present invention the screen S is formed of a series of rectangular vertical panels 1, each panel consisting of a backing sheet 2 having a multiplicity of long, narrow light reflecting elements 3 mounted thereon extending longitudinally thereof, each of said elements being triangular and wedge shaped in cross section so that the exposed reflecting surfaces 4 of said elements are arranged at an acute angle with respect to the surfaces which are attached to the backing sheet.

The narrow light reflecting elements may be made of any suitable material, but are preferably made of a spongy cellular material which is dimensionally stable such as cellular polyurethane resin or sponge rubber, for example. The said elements may be secured to the backing sheet in any suitable manner, as by adhesion. The exposed reflecting faces of the strips should be smooth and may be covered or coated with any suitable light reflecting material.

Preferably the material of which the elements are made is either black or dark in color so that the short faces 5 of the wedges which lie between the reflecting surface and the surface which is adhered to the backing sheet will be light absorbing. If a material is used which is not black or dark in color, this face of the wedge should preferably be covered or coated with a black or dark material which will absorb light.

The backing sheet may be made of any suitable material such as textile fabric or paper, preferably coated or impregnated with plastic material such as polyethylene, polyester, or other plastic sheet material having a thickness of approximately .010″.

If said backing sheet is made of paper or plastic material or of closely woven textile fabric, the backing sheet should be provided with perforations or apertures to permit adequate sound transmission. For example, the backing sheet may be provided with a multiplicity of small perforations 6, preferably about 1/32″ in diameter for the transmission of sound. These perforations are arranged in vertical rows between adjacent wedge shaped reflecting elements which are spaced apart a distance at least equal to the diameter of the perforations.

Alternatively, the backing sheet may be made of mesh textile material such as screen cloth, for example, having apertures therein which are adequate for sound transmisison. Screen cloth made of nylon having mesh apertures 1/16″ to 1/8″ square is admirably suited for use as a backing sheet because of its strength and durability. The wedge shaped reflecting elements secured thereto are spaced apart a distance sufficient to permit adequate sound transmission, as for example, about 1/32″ apart. Preferably the short faces 5 of the wedges are beveled back at an angle of about 45° to the backing sheet so that the light reflecting surfaces 4 of the wedges are wider than the surfaces which are attached to the backing sheet. Thereby, the free edges of the reflecting surfaces extend over and conceal the perforations or apertures between adjacent reflecting elements.

The angle between the reflecting surfaces 4 and the backing sheet 2 may vary from 3° to 30° depending on the particular section of the screen which the panel is intended to fill. In the panels near the center of the screen the angle will be small, but toward the edges of the screen the angle will be greater.

Preferably the panels are about 3′ wide and of whatever length is necessary to form a screen of the desired height. The panels are hung on a suitable curved framework and the edges of adjacent panels may be fastened together in any suitable manner. In a typical screen installation, the screen may be 30′ high and may cover an arc of approximately 130° on a radius of approximately 45′. For a screen of these dimensions twenty-four panels each having a width of 3′ would be required. The reflecting surfaces of the strips of the panels immediately adjacent the center of the screen would be angled only slightly, say 3° to 5°, to the backing sheet, but the reflecting surfaces of the other panels would be angled at increasing angles toward the outer edges of the screen, as for example, 20° to 30° for the outermost panels. The arrangement shown in FIG. 2 would be suited for the panels to the right of the center panels, as one faces the screen, but the angulation would be reversed for the panels to the left of the center panels.

The scale of FIGS. 1 and 2 is so small that it is not possible to indicate curvature of the backing sheet on a radius of 45′, but preferably the panels are so hung on their supporting framework that each panel is slightly curved. However, in many cases it is not necessary that each panel be curved, and the panels may be so hung that each panel is substantially the chord of an arc of the screen radius.

Preferably the reflecting strips 3 are only about ¼″ wide, and the width is so small that the individual strips are not visible to one viewing projected pictures on the screen. However, despite the narrow width of the strips, the fact that they are mounted on the backing sheets 2 obviates any tendency of the strips to flutter.

In certain theaters, and particularly in wide theaters in which many persons in the audience are seated some distance from the center line of the theater, it has been found desirable to curve slightly the reflecting surfaces of the light reflecting elements in the transverse direction, so that each reflecting element presents a slightly concave cylindrical surface to the audience. Thus, referring to FIG. 3, the reflecting surface 4′ of the reflecting elements 3′ are slightly concave in cross section, the radius of curvature preferably being between 2″ and 6″.

The panels may be easily mounted on and dismounted from a suitable frame. Because of the nature of the materials used, the panels may be rolled up for transportation. They may be manufactured in long lengths and cut to the desired length for installation.

A typical curved screen embodying such panels is illustrated diagrammatically in FIG. 4 in which the screen S is cylindrical in shape, having a concave configuration as viewed by the audience. The panels are supported and arranged in longitudinally abutting relationship so that there is no space between adjacent panels.

In certain systems for the projection of motion pictures, a plurality of projectors 10 may be arranged as shown to project onto adjacent screen areas. In other other systems of projection, a single projector may be used. In such installations, it is common practice to place a series of speaker units 11 behind the screen, said units being arranged at intervals for stereo effects. Typical audience areas are indicated by broken lines 12.

It will be understood that the invention may be variously modified and embodied within the scope of the subjoined claims.

I claim as my invention:

1. A panel for a projection screen comprising a backing sheet and a multiplicity of long, narrow, vertically extending light reflecting elements, said light reflecting elements being triangular and wedge shaped in cross section, having attaching surfaces adhered to said backing sheet, and having light reflecting surfaces extending at an acute angle to said backing sheet, said elements being parallel but spaced apart so that portions of said backing sheet are exposed between adjacent elements, said reflecting surfaces being wider than said attaching surfaces so that portions of said reflecting surfaces extend over and conceal said exposed portions of said backing sheet.

2. A panel for a projection screen as claimed in claim 1 in which said light reflecting surfaces and said attaching surfaces are connected by short backwardly beveled surfaces which are light absorbent.

3. A panel for a projection screen as claimed in claim 1 in which said light reflecting surfaces and said attaching surfaces are connected by short backwardly beveled surfaces arranged at an angle of approximately 45° to the backing sheet.

4. A panel for a projection screen as claimed in claim 1 in which the angle between said reflecting surfaces and said backing sheet is from 3° to 30°.

5. A panel for a projection screen as claimed in claim 1 in which said exposed portions of said backing sheet are perforated.

6. A panel for a projection screen as claimed in claim 1 in which said backing sheet is a mesh textile fabric.

7. A panel for a projection screen as claimed in claim 1 in which said reflecting surfaces are curved in cross section.

8. A panel for a projection screen as claimed in claim 1 in which said reflecting surfaces are concave cylindrical surfaces as viewed by the audience.

9. A projection screen comprising a plurality of panels, each panel comprising a backing sheet and a multiplicity of long, narrow, vertically extending light reflecting elements, said light reflecting elements being triangular and wedge shaped in cross section, having attaching surfaces adhered to said backing sheet, and having light reflecting surfaces extending at an acute angle to said backing sheet, said elements being parallel but spaced apart so that portions of said backing sheet are exposed between adjacent elements, said reflecting surfaces being wider than said attaching surfaces so that portions of said reflecting surfaces extend over and conceal said exposed portions of said backing sheet, said panels being arranged in longitudinally abutting relationship and in concave curved configuration as viewed by the audience.

References Cited by the Examiner

FOREIGN PATENTS 704,365   2/1931   France.
923,175   4/1963   Great Britain.

JULIA E. COINER, *Primary Examiner.*